United States Patent [19]

Diez et al.

[11] 4,213,178

[45] Jul. 15, 1980

[54] INPUT/OUTPUT COMMAND TIMING MECHANISM

[75] Inventors: Mark F. Diez; David O. Lewis; Thomas S. Robinson, all of Rochester, Minn.

[73] Assignee: International Business Machines Corporation, Armonk, N.Y.

[21] Appl. No.: 953,672

[22] Filed: Oct. 23, 1978

[51] Int. Cl.² .............................................. G06F 3/00
[52] U.S. Cl. ................................................... 364/200
[58] Field of Search ........................ 179/15 A, 15 AL; 364/200, 900

[56] References Cited

U.S. PATENT DOCUMENTS

| | | | |
|---|---|---|---|
| 3,828,325 | 8/1974 | Stafford | 364/200 |
| 3,972,023 | 7/1976 | Bodner | 364/200 |
| 4,016,548 | 4/1977 | Law | 179/15 A |
| 4,084,228 | 4/1978 | Dufond | 364/200 |
| 4,103,328 | 7/1978 | Dalmasso | 364/200 |

*Primary Examiner*—Charles D. Miller
*Attorney, Agent, or Firm*—Pennie & Edmonds

[57] ABSTRACT

A monitor circuit for overseeing input/output activity in a digital computing system is disclosed. The circuit comprises a memory array for storing subchannel status words, each of which corresponds to an input/output operation unit. Each subchannel status word includes a timing monitor field having a current count subfield, a count limit subfield, and a command-in-progress bit position. Circuits are provided for incrementing at timed intervals numbers encoded in the current count subfields of those subchannel status words against which a request for an input/output operation is outstanding. A circuit is provided for comparing the numbers encoded in the current count subfields to the count limit subfields to determine if a response to a request for an input/output operation is overdue.

4 Claims, 6 Drawing Figures

INPUT/OUTPUT COMMAND TIMING MECHANISM

TECHNICAL FIELD

The present invention relates to a circuit for overseeing input/output activity in a digital computer system.

BACKGROUND ART

Digital computers of today are able to communicate with input/output devices having radically different data command execution times. A keyboard terminal which generates data at tens of characters per second, a high-speed line printer which prints data at hundreds of characters per second, and a disk unit which reads and writes data at hundreds of thousands or even more characters per second might all communicate with a single digital computer over a shared input/output channel bus. Moreover, because of the differences in the requirements of users of computers, central processing units of modern general-purpose computers can usually be incorporated in a wide variety of computing systems having different groups of input/output devices. The need for flexibility in accommodating various input/output devices of greatly differing characteristics, however, gives rise to serious difficulties in designing the input/output channels of computers.

One such area of difficulty concerns the monitoring of input/output devices by a central processing unit to check for data errors and equipment malfunctions. It is desirable for information concerning a breakdown of an input/output device to be communicated to the central processing unit of a computing system to facilitate notifying the operator of the system of the problem. Consequently, the central processing unit is often given the task of monitoring various performance indicators of input/output devices, such as data word parity and message protocols, in order to detect equipment malfunctions. A fundamental performance indicator is the time required for an input/output device to respond to a request by a central processing unit for the device to carry out an input/output operation. The failure of an input/output device to respond to such a request can indicate a serious equipment malfunction and in any event, ordinarily requires the operator's intervention in order to accomplish the requested input/output operation. Different input/output devices, however, have vastly different response times. For example, a keyboard operator at a keyboard terminal will ordinarily take much longer to respond to a request to enter some data than a disk unit will take in responding to a request to supply data. Thus a delay in responding of one second might indicate that a disk unit was malfunctioning, whereas delays of much longer than a second might be typical for a keyboard terminal. Because of the great variation in response times of different input/output devices, conventional computers have typically relied on software programs to monitor the response time of input/output devices, if such monitoring was carried out at all. There has been no completely satisfactory unified mechanism for monitoring the response times of the wide variety of input/output devices to which a central processing unit can be connected.

DISCLOSURE OF THE INVENTION

We have invented a mechanism for overseeing input/output activity in a digital computing system which permits response times of different input/output operation units to be monitored to determine if their response times exceed different limits set under program control.

In particular, the invention includes a monitoring circuit for a digital computing system which comprises a processing unit, digital storage, and a plurality of input/output operation units. The input/output operation units are connected to an input/output channel bus for communication with the processing unit and storage. The circuit of the invention includes a memory array having a plurality of storage locations capable of storing a plurality of subchannel status words. Each subchannel status word corresponds to an input/output unit. In other words, the address of the subchannel status word in the memory array also designates an input/output operation unit. The subchannel status words encode control information for the input/output operation unit designated. Each subchannel status word has a timing monitor field which includes a current-count subfield, a count-limit subfield, and a command-in-progress subfield. Subchannel status words of preferred embodiments of the invention also include a command-timing-enabled subfield.

The monitoring circuit also includes a load-timing-control-data circuit connected to the central processing unit and to the memory array for loading status words selected by the central processing unit with timing control data. The count-limit subfield is loaded with data encoding a count-limit number. The command-in-progress bit position is set to a state which indicates an input/output operation has been requested of the corresponding input/output operation unit. The current-count subfield is cleared to a state which encodes the number zero. The command timing enabled bit position is set by an interval timer and ensures a full timing interval for timing comparison.

The circuit further includes an interval timer for emitting clock signals at timed intervals.

The circuit also includes a count-incrementer circuit connected to the interval timer and to the memory array for repetitively incrementing numbers encoded in the current-count subfields of at least those subchannel status words which indicate by their command-in-progress bit positions that an input/output operation has been requested. The repetitive incrementing is carried out in response to clock signals from the interval timer so that the number encoded in the current-count subfield of a particular subchannel status word measures the approximate time from the most recent request to the corresponding input/output operation unit for an input/output operation.

The monitor circuit also includes a comparator-search circuit for testing each subchannel status word for which the command-in-progress bit position indicates that an input/output operation request has been made. The test includes comparing the number encoded in the current-count subfield with the number encoded in the count-limit subfield for generating a response-overdue signal if the count limit has been exceeded.

Finally, the monitor circuit includes a command-end circuit connected to the input/output channel bus and to the memory array for accessing subchannel status words identified over the input/output channel bus to clear the command-in-progress bit position to a state indicating that the request for an input/output operation has been satisfied.

Preferably the count-limit number and current count numbers encoded in the timing monitor field are simply stored directly in the field.

The count-limit number encoded in the count-limit subfield of a particular subchannel status word determines the length of time before the central processing unit is notified that a response from the corresponding input/output operation unit is overdue. Since the count-limit number can be loaded afresh from the central processing unit in each request for an input/output operation, the mechanism permits an extremely flexible timing monitor control which can accommodate the variations in response-time characteristics of different input/output operation devices.

BRIEF DESCRIPTION OF THE DRAWINGS

Preferred embodiments of the invention are described below with reference to the following drawings.

BEST MODE FOR CARRYING OUT THE INVENTION

Figure 1:
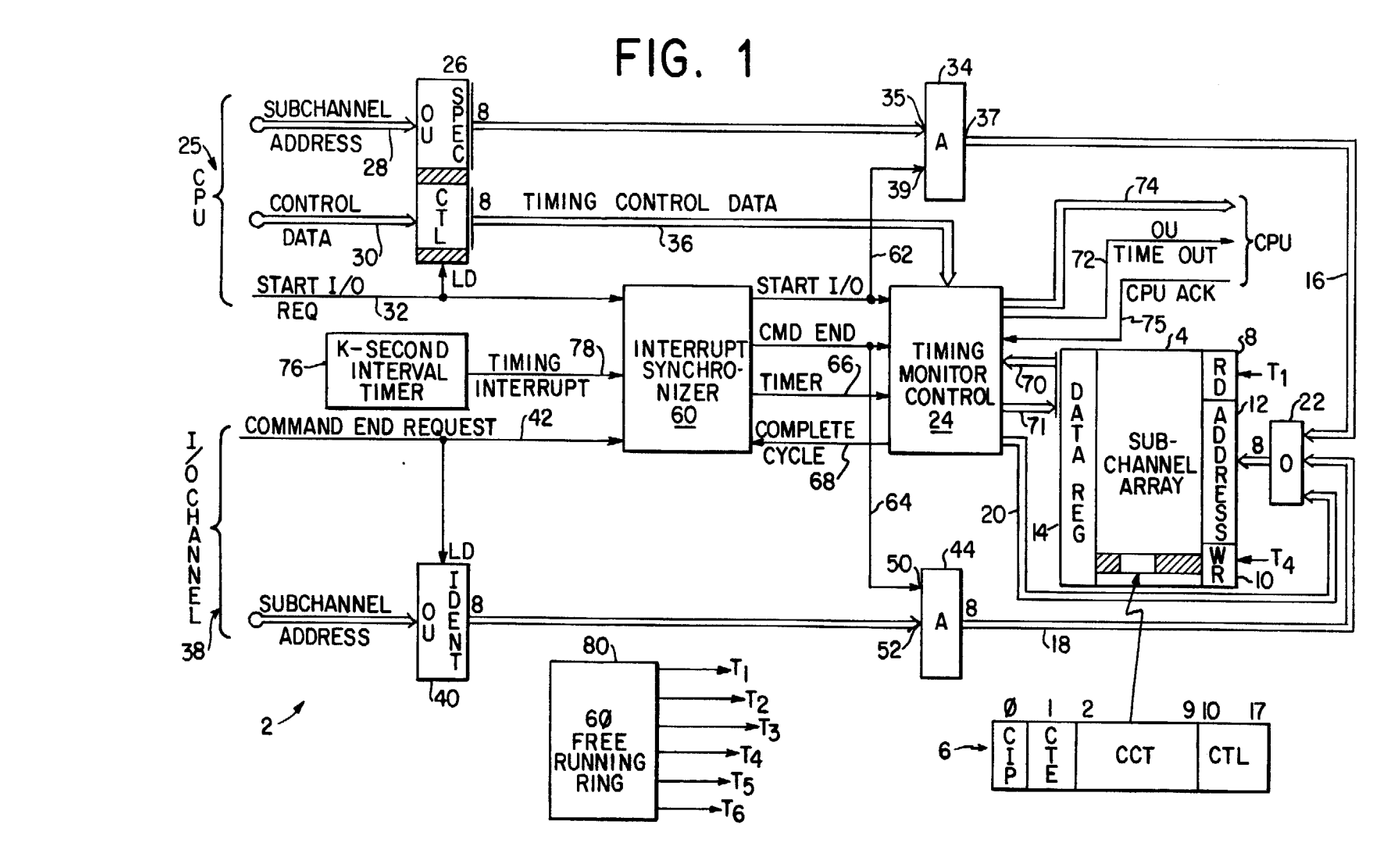
FIG. 1 is a schematic diagram of a timing monitor circuit of the present invention.

Referring now to FIG. 1, a monitoring circuit 2 oversees input/output activity in a digital computer system. The digital computer system has an input/output channel bus to which a plurality of input/output operation units are connected for transferring data into and out of the computer. For conciseness, only those features of the digital computer system necessary for a full understanding of the present invention are described below. Other elements of the computer system and the input/output devices can be completely conventional and a discussion of them would only tend to obscure the invention.

Control information for effecting input/output data transfers is stored in a subchannel memory array 4. The subchannel memory array 4 is a read-write storage device having a plurality of memory locations for storing a plurality of subchannel status words. The address of the location of the subchannel status word in the subchannel memory array 4 serves to designate the input/output operation unit which is to carry out the input/output operation. Each subchannel status word stores information for sustaining a particular input or output operation. For example, the subchannel status word specifies the priority of a requested operation relative to other input/output operations pending in the computer system and provides control information to the input/output operation unit. In addition, each subchannel status word includes a timing monitor field 6 illustrated schematically in FIG. 1. The timing monitor field includes four subfields: a command-in-progress bit (CIP); a command-timing-enabled bit (CTE); a current-count field (CCT); and a count-limit field (CTL). A logic one in the command-in-progress bit position indicates that the input/output operation by the status word has been requested by the central processing unit. A logic one in the command-timing-enabled bit position indicates initiation of timing for a particular input/output unit. The current-count field generally contains a number which measures the time which has elapsed since the beginning of the most recent input/output rquest. The command-time-limit field contains a number which provides a limit value to determine when a confirmation of the completion of the input/output operation is overdue.

The subchannel array 4 includes a read-enable input 8, a write-enable input 10, an access address input 12, and a data register 14 for latching status words read from or written into the subchannel memory array 4. For simplicity, only data paths carrying timing-control data are illustrated. Address words for the subchannel address input 12 are transmitted over a first 16, a second 18, or a third 20 address bus. The three address busses 16, 18 and 20 are one byte wide. Address signals on the first 16, second 18, and third 20 address busses are obtained respectively from the central processing unit, the input/output channel bus, and a timing-monitor-control circuit 24. The three address busses are connected to the subchannel address input 12 through a subchannel address bus OR gate 22 which, as will be recognized by those skilled in the art, is made up of eight three-input OR gates, the three inputs of each OR gate being connected to corresponding signal lines of the three address busses 16, 18, or 20.

A central processing unit (not shown) is connected to the monitoring circuit 2 through a CPU port 25 which is provided for receiving signals requesting the start of an input/output operation, together with an address which specifies the subchannel corresponding to the operation unit which is to handle the operation. In addition, a binary count limit is received at the CPU port 25 from the central processing unit of the computer. Thus the specification of an operation unit and of a count limit can be under the control of a programmer of the computer.

The CPU port 25 includes a CPU port input register 26 for latching data from the central processing unit. Connecting the central processing unit to the CPU port input register 25 is a subchannel address bus 28, a control-data bus 30, and a start I/O request signal line 32. The subchannel address bus 28 and the control-data bus 30 are connected to the data inputs of the input register 26. The start-I/O-request signal line 32 is connected to a load-enable input of the input register 26.

Eight outputs of the CPU port input register 26 which correspond to the address of the subchannel status word specified by the central processing unit are connected to the eight signal lines making up the first address bus 16 through a first bus-enabling AND gate 34. The first bus-enabling AND gate 34 has a bus input 35, a bus output 37, and a gate-enabling input 39. The bus enabling AND gate 34 is made up of eight individual AND gates. A first input of each of the AND gates is connected to a bus signal line. The first inputs collectively define the bus input 35. Second inputs of the AND gates are connected to a common control line which serves as the gate-enabling input 39. The outputs of the AND gates define the bus output 37. Thus eight signal paths are collectively enabled or clamped at logic zero by a logic-one signal or a logic-zero signal, respectively, applied to the gate enabling input 39. Other bus-enabling AND gates referenced below are constructed and operate analagously.

The bit positions of the CPU port input register 26 which latch the count limit number from the central processing unit are connected to the timing-monitor-control circuit 24 by a timing control data bus 36. Data ports for the other control information latched in the CPU port input register 26 are not shown for simplicity.

Address words on the second address bus 18 are supplied through an I/O channel port 38. The I/O channel port 38 includes an operation-unit-identification register 40 whose data inputs are connected to the input/output channel bus for receiving the subchannel address which identifies the operation unit transmitting a command-end request. A command-end request, carried over a command-end-request signal line 42, signifies that an input/output operation has been successfully completed. The outputs of the operation-unit-identification register 40 are connected to the second address bus 18 through a second bus enabling AND gate 44.

The first and the second bus-enabling AND gates 34 and 44 are provided to prevent more than one address word from appearing at the inputs of the subchannel-address-bus OR gate 22 at any given time. An interrupt synchronizer 60 is provided to synchronize accesses to the subchannel memory array 4 to avoid attempting multiple simultaneous accesses. Thus the interrupt synchronizer 60 generates a start-I/O-signal over a start-I/O signal line 62 which is connected to the gate enabling input 39 of the first enabling bus AND gate 34. The interrupt synchronizer 60 also generates a command-end signal over a command-end signal line 64 which is connected to a gate enabling input 50 of the second enabling bus AND gate 44. A timer signal transmitted by the interrupt synchronizer 60 over a timer signal line 66 defines the time an address word appears on the third address bus 20. The start I/O, command end, and timer signals generated by the interrupt synchronizer 60 are synchronized so that at most one address is presented to the memory array address OR gate 22 at any given instant. The circuit of the interrupt synchronizer 60 is described below in connection with FIG. 2. Although not shown on FIG. 1, signal lines 63, 65, and 67 connect the interrupt synchronizer 60 to the timing monitor control 24 for transmitting the logic inverses of the start I/O, command end, and timer signals, respectively. A cycle complete signal line 68 connects the timing monitor control 24 to the interrupt synchronizer 60 and is provided for transmitting a signal indicating that a timing monitor cycle is complete.

The timing-monitor-control circuit 24 is connected to the timing monitor field of the data register 14 of the subchannel memory timing-monitor-data input and output busses 70 and 71. Also connected to the timing-monitor-control circuit 24 is an operation-unit time-out signal line 72, which in turn is connected to the central processing unit. When the operation unit time-out signal line carries a logic one, one of the operation units is overdue in responding to an input/output operation request. The subchannel address identifying the overdue operational unit is transmitted to the central processing unit over the overdue-operation unit bus 74. A CPU acknowledgment signal line 75 is provided to permit the central processing unit to acknowledge receipt of an operation-unit time-out signal.

An interval timer 76 is connected to the interrupt synchronizer 60 by a timing-interrupt-request signal line 78. The interval timer 76 is a conventional pulse generator which emits logic pulses at intervals of 30 seconds.

Figure 2:
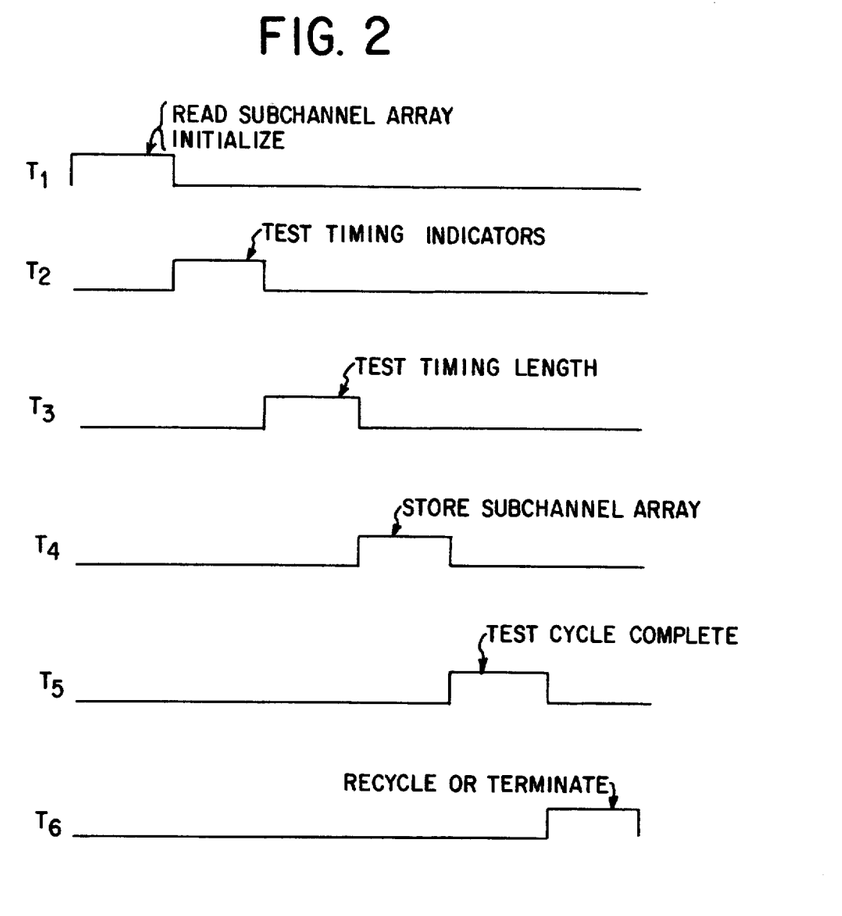
FIG. 2 is a timing diagram illustrating the time intervals of the clock cycle of the circuit.

Timing for the monitor circuit 2 is provided by a six-phase, free-running ring 80 which emits pulses cyclically on six signal lines desingated T1-T6, as is shown in FIG. 2. For simplicity, the six timing signal lines from the free-running ring 80 are not shown directly connected to the various circuit elements illustrated in the drawings. Instead, such a connection is indicated by a signal input line designated with the appropriate time character.

Figure 3:
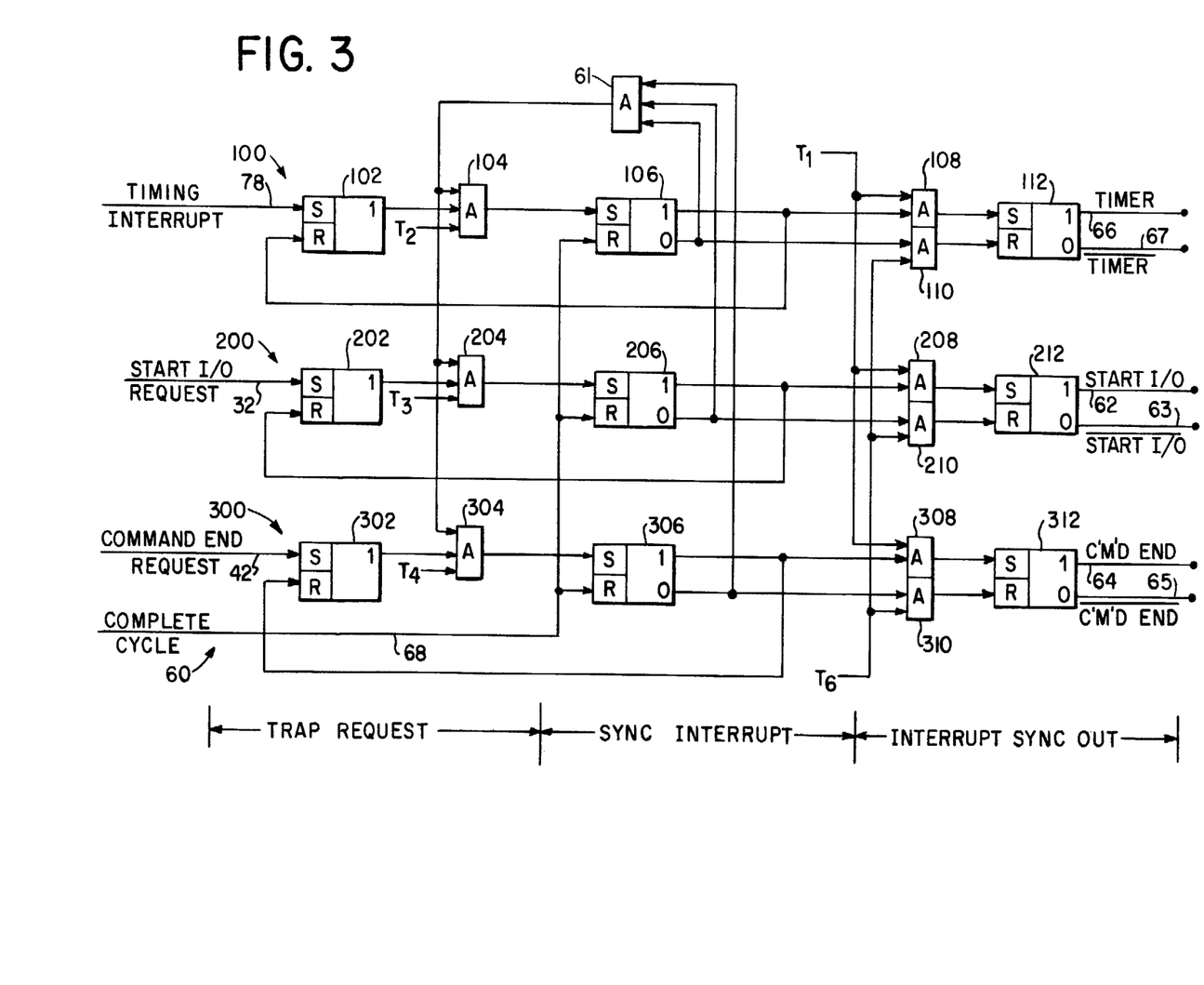
FIG. 3 is a circuit diagram of an interrupt synchronizer which is a component circuit of the circuit of FIG. 1.

Referring now to FIG. 3, the circuit of the interrupt synchronizer 60 is shown. The circuit may conveniently be regarded as being divided into three channels: a timing-interrupt channel 100, a start I/O channel 200, and a command-end channel 300.

The timing-interrupt channel 100 includes a trap-request latch 102 to which the timing-interrupt-request signal line 78 is connected. The output of the trap-request latch 102 is connected to a first input of a T2-priority-enabling AND gate 104, a three-input AND gate. A second input is connected to a channel-busy AND gate 61. A third input of the T2-priority-enabling AND gate 104 is connected to the T2-signal line from the free-running ring 80. The output of the T2-priority enabling AND gate 104 is connected to the set input of an interrupt-synchronizer latch 106. The reset input of the interrupt-synchronizer latch 106 is connected to the cycle complete signal line 68. The output of the interrupt-synchronizer latch 106 is connected to the reset input of the trap-request latch 102 and to a first input of a T1-enabled AND gate 108. The complimentary output of the interrupt-synchronizer latch 106 is connected to an input of the channel busy AND gate 61 and to a T6-enabled AND gate 110. The output of the T1-enabled AND gate 108 is connected to the set input of the timing-interrupt-channel output latch 112. The reset input of the timing-interrupt-channel output latch 112 is connected to the output of the T6-enabled AND gate 110. The second inputs to the T1- and T6-enabled AND gates 108 and 110 are connected respectively to the T1- and T6-timing signal lines of the free-running ring 80. The output of the timing-interrupt-channel output latch 112 is connected to the timer signal line 66 and the complimentary output is connected to the signal line 67.

The start-I/O channel 200 and the command-end channel 300, respectively, have identical circuit elements to the timing-interrupt channel 100. For conciseness, only differences between the three channels will be described.

The start I/O channel 200 differs from the timing-interrupt channel 100 in that the start I/O request signal line 32 is connected to the trap request latch 202 and in that the third input of a T3-priority-enabling AND gate 204 is connected to the T3-timing signal line from the free-running ring 80. The output of the start-I/O channel 200 is transmitted over the start-I/O signal line 62, with the complimentary output being available on the signal line 63.

The command end channel 300 differs from the other two channels in that the command-end-request signal line 42 is connected to the set input of the trap-interrupt latch 302 and in that the third input of a T4-priority-enabling AND gate 304 is connected to the T4-timing signal line. The output of the command-end channel 300 is transmitted over the command-end-signal line 64, with the complimentary signal appearing on signal line 65.

In operation, each of the three trap-request latches 102, 202, and 302 latches signals which arrive over the signal line connected to its set input. Signals at the inputs of the three channels 100, 200 and 300, request accesses to the subchannel memory array 4, and in general arrive at asynchronous times with respect to one another. The latched output signals of the three trap-request latches 102, 202, and 302, however, are passed in a timed priority order to the respective interrupt synchronizer latches 106, 206, and 306. This is accomplished with the priority-enabling-AND-gates 104, 204, and 304 which are enabled by sequential timing signal pulses and by the output of the channel busy AND gate 61, which transmits a logic 1 only when all three interrupt synchronizer latches 106, 206, and 306 are cleared to zero. The clearing is accomplished by a signal over the cycle-complete signal line 68. The outputs of the interrupt synchronizer latches 106, 206, and 306 are connected to the respective channel output latches 112, 212, and 312 by T1 enabled AND gates 108, 208, and 308 and T6 enabled AND gates 110, 210, and 310, which synchronize the beginning and end of the timer, start-I/O, and command-end signals with the beginning and end of the clock cycle of the free-running ring 80.

Figure 4A:
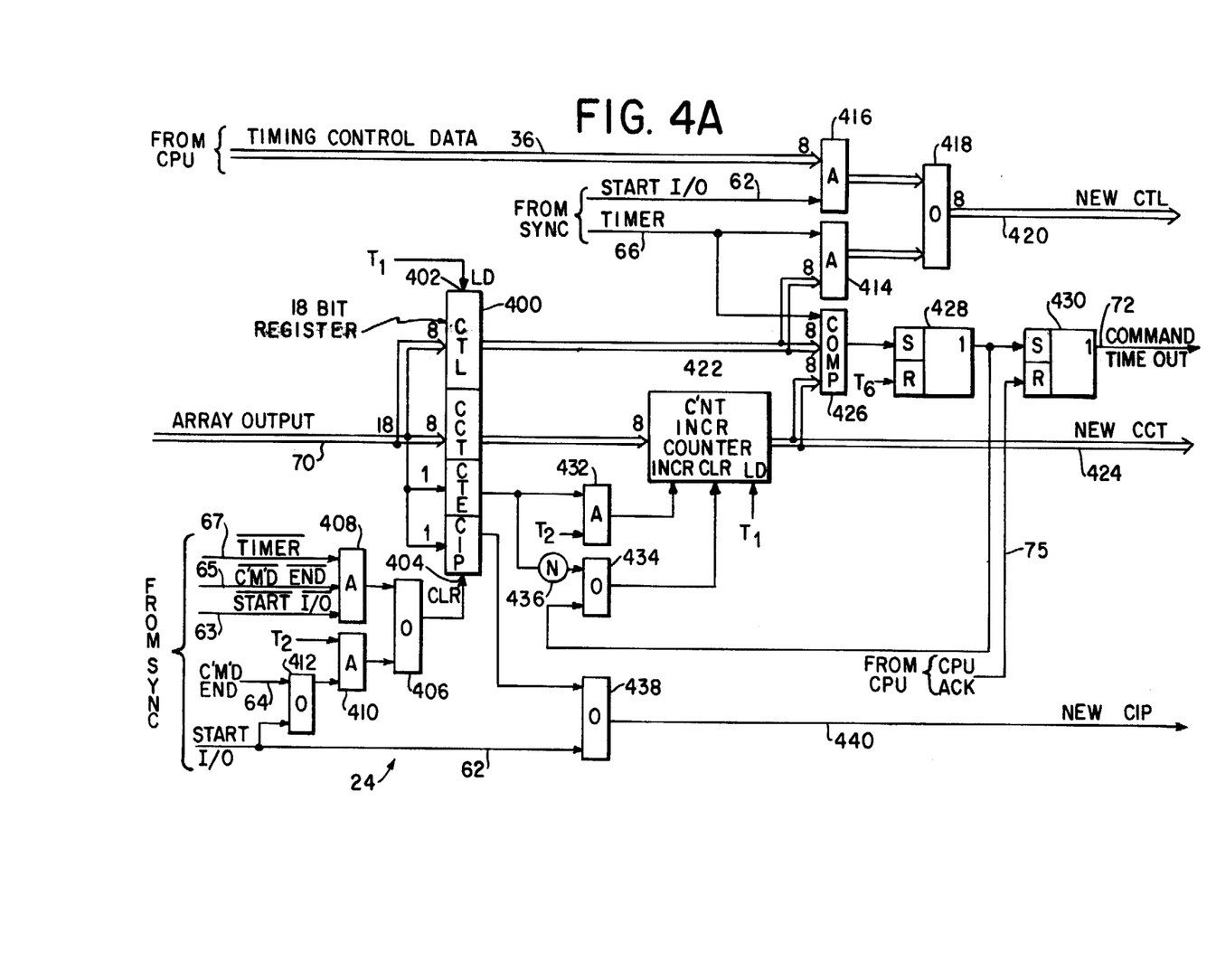
FIGS. 4a and 4b taken together are a circuit diagram of a timing-monitor-control circuit which is a component circuit of the circuit of FIG. 1.
Figure 4B:
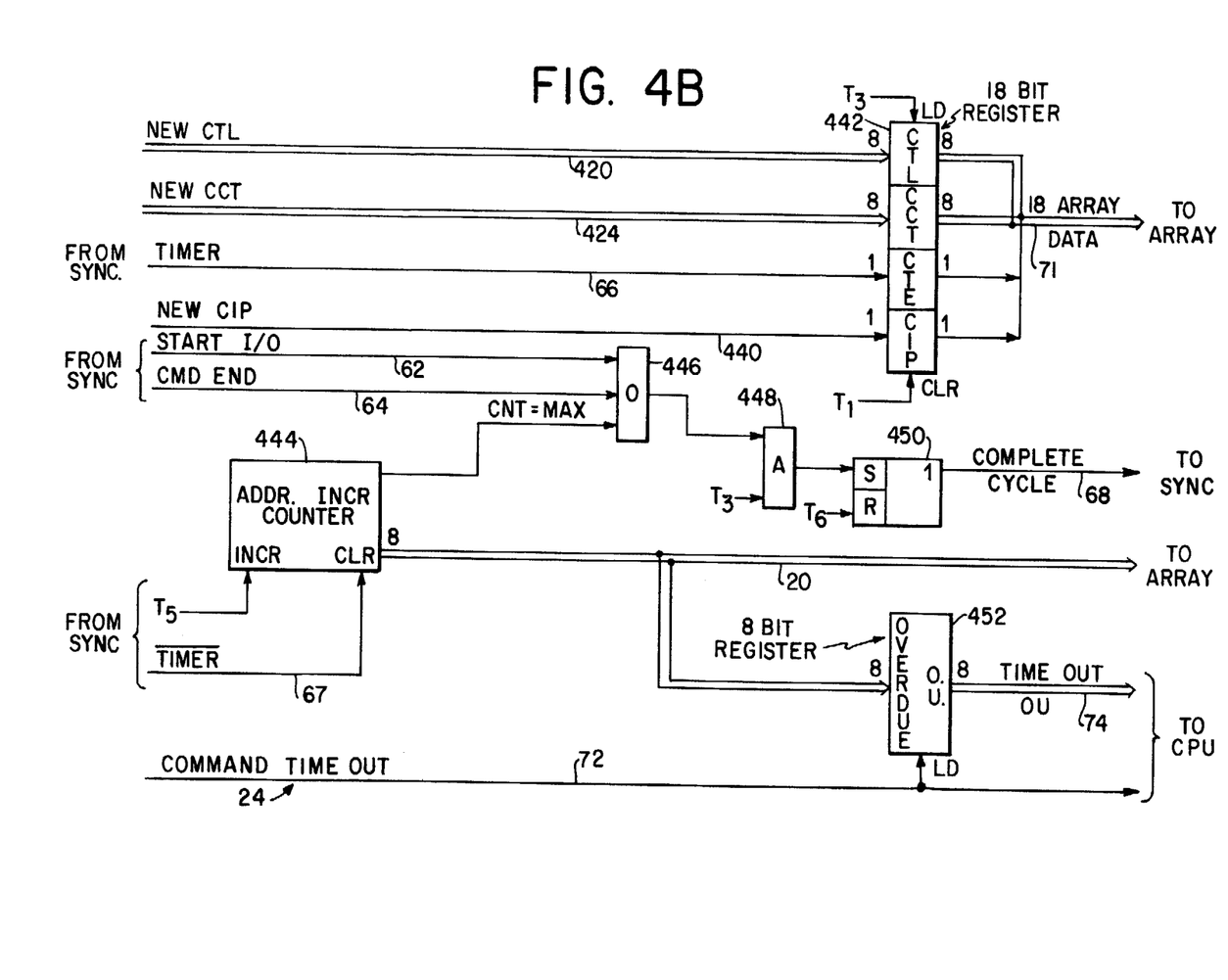

The circuit diagram of the timing-monitor-control circuit 24 is illustrated in FIGS. 4A and 4B. The timing-monitor-data input bus 70 is connected to a timing monitor-control-input register 400. The load-enabling input 402 of the timing-monitor-control input register 400 is connected to the T1 timing signal line from the free running ring 80. The clear-enabling input 404 of the register 400 is connected to an output of an OR gate 406. One input of the OR gate 406 is connected to a three input AND gate 408 whose three inputs are connected respectively to the complimentary outputs of the timing interrupt channel 100, the command end channel 300, and the start I/O channel 200 of the interrupt synchronizer 60. A second input of the OR gate 406 is connected to a $T_2$-enabling AND gate 410, one of whose inputs is connected to the $T_2$ timing signal line from the free-running ring 80. A second input is connected to the OR gate 412, whose two inputs are connected respectively to the command-end signal line 64 and the start I/O signal line 62.

The outputs of the timing monitor control input register 400 corresponding to CTL, CCT, CTE and CIP fields are connected as follows.

The outputs corresponding to the CTL field in the register 400 are connected to a first bus-switch AND gate 414. The first bus switch AND gate 414 is a bus-enabling AND gate whose enabling input is connected to the timer signal line 66. The timing-control data bus 36 from the CTL field of the CPU-port input register 26 is connected to a second bus-switch AND gate 416, a bus-enabling AND gate whose enabling input is connected to the start-I/O signal line 62 from the interrupt synchronizer 60. The outputs of the first and second bus-switch AND gates are connected to a bus-switch OR gate 418. The output of the bus-switch OR gate 418 is connected to a new CTL bus 420. Thus, when a logic one appears on the start I/O line 62 and a logic zero on the timer signal line 66, the signals on the timing control data bus 36 are passed to the new CTL bus 420. Conversely, when a logic one appears on the timer signal line 66 and a logic zero on the start-I/O signal line 62, the binary number in the CTL field of the timing-monitor-control input register 400 is passed to the new CTL bus 420. If both the start-I/O signal line 62 and the timer signal line 66 carry a logic zero, the signal lines of the new CTL bus are clamped at logic zero. The interval synchronizer 60 insures that the start-I/O signal line 62 and the timer signal line 66 do not both carry logic ones simultaneously.

The bit position outputs of the CCT field of the timing-monitor-control input register 400 are connected to the data inputs of an eight-bit count-increment counter 422. The count-increment counter 422 is loaded in response to a signal applied to a load input which is connected to the $T_1$ timing signal line. The outputs of the count increment counter 422 are connected to a new CCT data bus 424. The signal lines making up the new CCT data bus 424 are connected to an A input of a comparator circuit 426. The signal lines which reflect the command timing length CTL field of input register 400 are connected to a B input of the comparator circuit 426. The comparator circuit 426 generates a true output when strobed by a signal on the timer signal line 66 and when the A input equals the B input, that is, when the command-timing-length field (CTL 400) is equal to the current command time (new CCT 424). The output of the count-limit comparator 426 is connected to the set input of a limit-equalled latch 428. The reset input of the limit-equalled latch 428 is connected to the $T_6$ timing signal line from the free-running ring 80. The output of the limit equalled latch 428 is connected to the set input of a command time-out latch 430 whose output is connected to the command time-out signal line 72.

The CTE-bit-position output of the timing-monitor-control input register 400 is connected to a T2-enabled AND gate 432. The second input of the T2-enabled AND gate 432 is connected to the $T_2$ signal time. The output is connected to an increment input to the count-increment counter 422. The presence of a logic one in the CTE position of the timing-monitor-control input register 400 enables the incrementing of the count stored in the CCT field of the register. The CTE bit position output of the timing monitor control input register 400 is also connected to a count clear OR gate 434 through an inverter 436. A second input of the count clear OR gate 434 is connected to the output of the limit-equalled latch 428.

The CIP-bit-position output of the timing-monitor-control input register 400 is connected to a first input of a CIP OR gate 438. A second input to the CIP OR gate 438 is connected to the start-I/O signal line 62. The output of the CIP OR gate is connected to a new CIP signal line 440. Thus the new CIP signal line 440 carries a logic one whenever the start-I/O signal line 440 carries a logic one or the CIP bit of the timing monitoring field stored in the register 400 is one.

Referring now to FIG. 4B, a timing-monitor-control output register 442 is connected to the new CTL data bus 420, the new CCT data bus 424, the timer signal line 66 and the new CIP signal line 440. A clear input of the register is connected to the $T_1$ timing signal line for clearing the register at the beginning of a cycle. The register is loaded at the $T_3$ time, since its load input is connected to the $T_3$ signal line of the free-running ring 80. The data outputs of the timing-monitor-control register 442 are connected to the data register 14 of the subchannel memory array 4 by the timing-monitor-data input bus 71.

To examine the timing-monitor fields of each subchannel status word stored in the subchannel array 4, a mechanism is provided in the timing-monitor-control circuit 24 for sequentially generating the address of the subchannel status words. An eight-bit address-increment counter 444 generates an address of a subchannel status word to be read. An increment input of the address increment counter 444 is connected to the $T_5$ timing signal line of the free-running ring 80. A clear input of the address-increment counter 444 is connected to the signal line 67 which carries the complimentary output signal from the timing interrupt channel of the interrupt synchronizer 60. Thus the counter is incremented during the $T_5$ phase of the cycle and is cleared when the timer signal is a logic one. The address increment counter 444 has a counter overflow which transmits a logic one when the counter value in the counter equals its maximum value.

The counter-overflow output of the address increment counter 444 is connected to a first input of a cycle-complete OR gate 446. The cycle-complete OR gate 446 is a 3-input OR gate. A second input of the complete cycle OR gate 446 is connected to the start-IO signal line 62, and a third input is connected to the command-end signal line 64. The output of the cycle-complete OR gate 446 is connected to a $T_3$-enabled AND gate 448, whose output in turn is connected to the set input of a complete-cycle latch 450. The reset input to the complete-cycle latch 450 is connected to a $T_6$-timing signal line. The output of the complete-cycle latch 450 is connected to the complete-cycle signal line 68. Thus three conditions can generate a complete cycle signal: a start I/O signal, a command end signal, or the appearance of the maximum address in the address-increment counter 444, which indicates that all of the subchannel status words in the memory array 4 have been accessed.

The count output of the address increment counter 444 is connected to the third address bus 20. In addition, an overdue-operation-unit register 452 is connected to the address-increment counter 444. The load input of the overdue operation unit 452 is connected to the command timeout signal line 72. Thus, when a subchannel status word is encountered for which the current count equals the count limit, indicating that an operation unit is overdue, its address is loaded into the overdue-operation-unit register 452. The output of the overdue-operation-unit register 452 is connected to the central processing unit.

Figure 5:
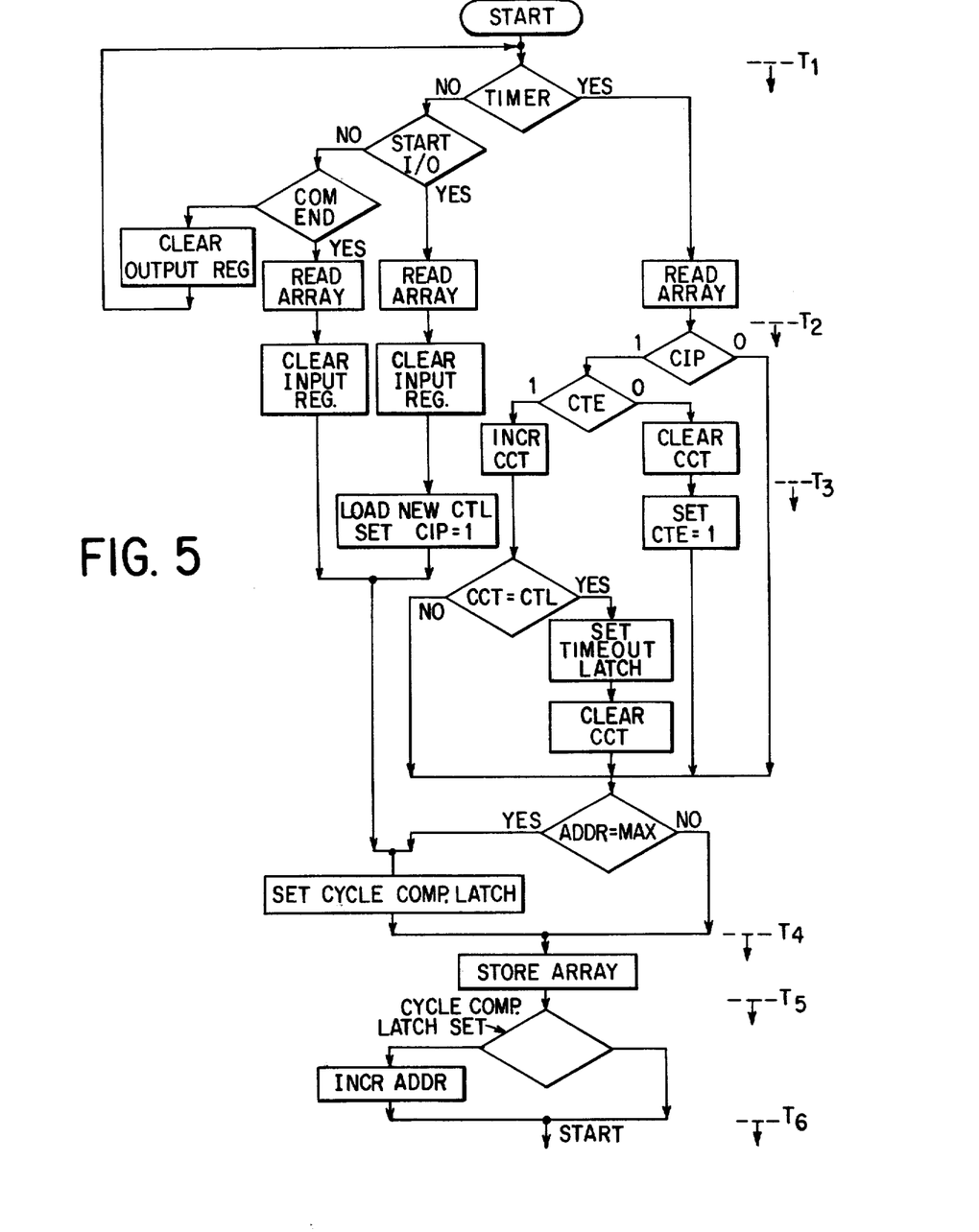
FIG. 5 is a flow diagram which illustrates the operation of the circuit of FIG. 1.

Turning now to FIG. 5, a flow chart illustrating the operation of the circuit of FIG. 1 is presented. Since the flow chart is self-explanatory, it will be described only briefly. The time intervals in which the steps in the flow chart are accomplished are indicated along the righthand margin. So long as there is no timer request signal, no start I/O request signal and no command end request signal, the circuit cycles around the loop in the upper lefthand corner of the flow chart defined by the decision "NO" branches from the three branch diamonds. The appearance of a clock signal from the interval timer 76 causes a branch along the YES branch of the timer diamond. Similarly, the appearance of a start I/O request or a command end request causes a branch along the YES branches of the start I/O and command end branch diamonds respectively.

A start I/O request from the central processing unit causes the subchannel status word corresponding to the input/output unit to which the request is directed to be read from the memory array 4. The timing-control circuit input register 400 is cleared, which clears the count-limit field, the current-count field, the count-timing enabled bit and the command-in-progress bit to logic zero. Subsequently the new count limit from the central processing unit is loaded into the timing-monitor control output register 442 and the command-in-progress bit position in the output register is set to logic one. The new timing control data is subsequently loaded into the memory array 4.

A command end request from an input/output operation unit, which indicates the successful completion of an input/output operation, causes the timing-monitor-control circuit input register 400 to be cleared, as did the start I/O request. However, in the case of the command-end request, the cleared timing monitor field is loaded into the memory array 4. Thus the command-in-progress bit remains at logic zero, indicating no input/output operation request is outstanding against the corresponding input/output operation unit.

A clock signal from the interval timer 76 causes each subchannel status word to be read from the memory array 4 in sequence. The time intervals between the clock signals are selected to be small enough to allow adequate testing resolution, but large enough to minimize the impact of the testing on the computer system. A clock-signal spacing of 30 seconds is suitable. If both the command-in-progress bit and the count-enabled bit are one, the current count number stored in the status word is incremented. The current count is compared against the count limit after incrementing, and, if the count limit equals the current count, the timeout latch is set, signalling that a response from an input/output operation unit is overdue.

It is not intended to limit the present invention to the specific embodiment described above. For example, the process described above could be implemented with a microprogrammed processor instead of hardwired logic gates as shown. In such a case the flow chart of FIG. 5 could be used in programming the microprogrammed processor. It is recognized that these and other changes may be made in the circuit and process specifically described herein without departing from the scope and teaching of the instant invention, and it is intended to encompass all other embodiments, alternatives, and modifications consistent with the invention.

We claim:

1. A circuit for overseeing input/output activity in a digital computing system comprising a processing unit, digital storage, and a plurality of input/output operation units, the input/output operation units being connected to an input/output channel bus for communication with the processing unit and storage, the circuit comprising:
(a) a memory array having a plurality of storage locations capable of storing a plurality of subchannel status words, each subchannel status word corresponding to an input/output operation unit and encoding control information for an input/output operation by the input/output operation unit, each subchannel status word having a timing monitor field including a current-count subfield, a count-limit subfield, and a command-in-progress subfield;
(b) load-timing-control-data circuit means connected to the central-processing unit and to the memory array for loading subchannel status words selected by the central processing unit with timing control data in response to control signals from the central processing unit, the count-limit subfield being loaded with data from the central processing unit encoding a count-limit number, the command-in-progress bit position being set to a state indicating that an input/output operation had been requested of the corresponding input/output operation unit, and the current-count subfield being cleared to a state encoding the number zero;

(c) an interval timer for emitting clock signals at timed intervals;

(d) count-incrementer circuit means connected to the interval timer and to the memory array for repetitively incrementing numbers encoded in the current-count subfields of subchannel status words for which the command-in-progress subfield indicates that an input/output operation has been requested, the repetitive incrementing being carried out in response to clock signals from the interval timer so that the number encoded in the current-count subfield of a particular subchannel status word measures the approximate time from the most recent request to the corresponding input/output operation unit for an input/output operation;

(e) comparator-search circuit means for testing each subchannel status word for which the command-in-progress bit position indicates an input/output operation request has been made by comparing the number encoded in the current-count subfield with the number encoded in the count-limit subfield and for generating a response overdue signal if the count limit has been exceeded; and (f) command-end circuit means connected to the input/output channel bus and to the memory array for accessing subchannel status words identified over the input/output channel bus to clear the command-in-progress subfield to a state indicating that the request for an input/output operation has been satisfied.

2. The circuit according to claim 1 in which the count-incrementer circuit means includes:

(d.1) an address counter for sequentially generating the addresses of the subchannel status words in the memory array:

(d.2) read-array circuit means connected to the address counter and to the memory array for fetching at least the current-count subfield and the count-limit subfield of a subchannel status word whose address has been generated by the address counter;

(d.3) an incrementer connected to the read-array circuit means for incrementing the number encoded in the current-count subfield of the subchannel status word fetched from the memory array; and (d.4) write-array circuit means connected to the incrementer and to the memory array for writing the encoded incremented number into the current-count subfield of the subchannel-status-word location addressed by the address counter.

3. The circuit according to claim 2 in which the comparator-search circuit means includes a comparator for signalling when a number of a first input equals a number at a second input, the first input being connected to the incremented number output of the incrementer and the second input being connected to a fetch count-limit subfield output of the read-array circuit means.

4. The circuit according to claim 3 in which the timing monitor field of each subchannel status word further includes a command-timing-enabled subfield defining a clear state and a counter-enabled state, and the count-incrementer circuit means further includes:

(d.5) clear-incrementer circuit means connected to the read-array circuit means and to the incrementer for clearing the incrementer in response to a clear state in the command-timing enabled subfield.

* * * * *